United States Patent Office 3,721,262
Patented Mar. 20, 1973

3,721,262
PRESSURE CONTROL APPARATUS FOR CONTROLLING THE FLOW OF VISCOUS FLUIDS
Peter Twatt Work, Irvine, Scotland, assignor to Ceramic Engineering Limited, Glasgow, Scotland
Filed Dec. 1, 1971, Ser. No. 203,557
Claims priority, application Great Britain, Dec. 4, 1970, 57,696/70
Int. Cl. F16k 31/36
U.S. Cl. 137—488      4 Claims

ABSTRACT OF THE DISCLOSURE

This invention relates to pressure control apparatus for controlling the flow of viscous fluids particularly casting slip from a main supply to a feed manifold and comprises a ball valve located in the main supply to allow or prevent the flow of slip to the feed manifold. The ball valve is actuated by an actuator device and damper means and the actuator is controlled by a pressure regulating valve and a pressure sensitive relay valve which monitors the fed manifold pressure and supplies a signal to actuate the pressure regulating valve which converts a signal of low flow characteristics to an equal signal pressure of high flow characteristics.

---

The apparatus allows casting slip to be fed to a series of moulds and to be maintained at a low pressure in the moulds such that the moulds remain completely full but not subject to a pressure which is sufficiently high to cause a fracture of the mould by closely controlling the pressure in the mould.

This invention relates to pressure control apparatus for controlling the flow of viscous fluids.

More specifically the apparatus according to the invention is adapted to control the flow of viscous fluids, such as casting slip used in the pottery industry, from a main supply pipe into a galley feeding a series of casting moulds so that the pressure in the galley does not exceed a predetermined pressure setting despite varying flow conditions.

In casting hollow articles of vitrous china or other ceramic substances the casting slip in the mould must be maintained at a low pressure so that the moulds remain full during a casting cycle but not subject to a pressure sufficiently high to cause a fracture of the moulds. This problem has been overcome by continuous casting methods whereby the slip continually flows through the mould at a low pressure.

The present invention provides for apparatus in which casting slip is fed to a mould or a series of moulds and the slip is maintained at a low pressure in the moulds so that the moulds remain completely full during a casting cycle.

Because of the ability of the apparatus to closely control the pressure in the moulds it is no longer necessary to maintain a continuous flow of slip through the moulds during a casting cycle and as the apparatus has the facility to control the pressure in the feed manifold over varying flow rates, vitreous china pieces of varying dimensions can be cast at the same time.

According to the invention apparatus for controlling the flow of viscous fluids, from a supply manifold to a feed manifold comprises a control valve located in the supply manifold to control pressure of the fluid in the feed manifold, pneumatically operable actuator means for opening and closing the control valve, hydraulic damper means adapted to control the rate of movement of the actuator means when the actuator means is operative to open the control valve, an air pressure supply source control means for air pressure supplied to the actuator means and valve means for monitoring the feed manifold pressure and to supply a signal to actuate the control means.

A preferred embodiment of the invention is illustrated by way of example in the accompanying drawings in which.

Figure 1:
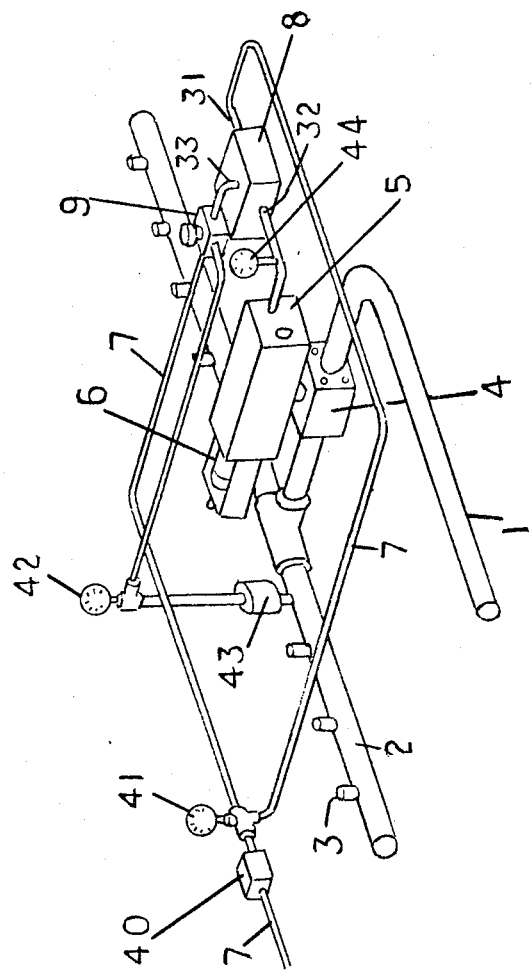
FIG. 1 is a schematic view of the apparatus according to the invention.

Referring to FIG. 1 of the drawings a main supply manifold denoted at 1 supplies fluid in the form of slip to a feed manifold 2 having outlets 3 which supply the slip to moulds (not shown). A ball valve 4 located in the main supply manifold 1 is in contact with the fluid and acts as a variable area flow orifice to control the flow of fluid and pressure of fluid downstream of the valve in the feed manifold 2.

The ball valve 4 is actuated and controlled by an actuator device 5 which is pneumatically operable to control the opening and closing of the ball valve 4 and when operable to open the ball valve, the rate of movement of the actuator device 5 is controlled by a hydraulic damper 6.

Conduits 7 carry an air pressure supply at a pressure normally maintained at approximately 80 p.s.i. from a source not shown.

A supply of compressed air is fed to the actuator device 5 through pressure regulating valve means 8 which controls the air pressure to the actuator device 5.

Figure 5:
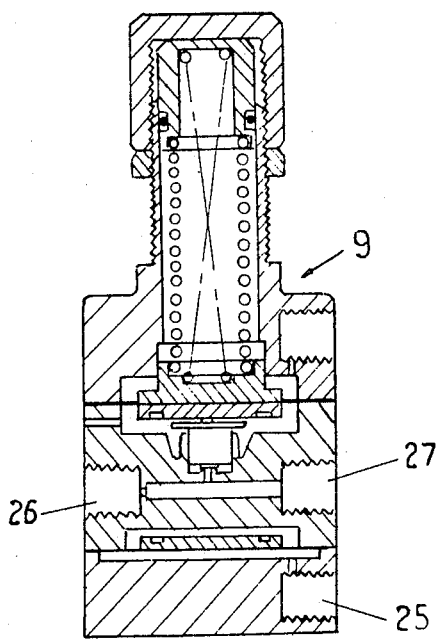

A pressure sensitive relay valve 9, illustrated in FIG. 5, has an input pressure port 25, communicating with the feed manifold 2, a supply pressure port 26 communicating with the air pressure supply 7, and an output pressure port 27 communicating with the regulating valve means 8. The relay valve 9 monitors the pressure in the feed manifold 2 and provides an inverse output pressure signal to the pressure regulating valve means 8, i.e. with zero feed manifold pressure the output is full system air pressure and as the feed manifold pressure rises to a preset level, the output pressure is reduced to zero. The signal pressure from the valve 9 is fed to the pressure regulating valve means 8 to control the air pressure fed from the regulating valve means 8 to the actuator device 5.

The ball valve 4 consists of a body member having a spherical shaped valve spindle therein with a diametrical bore therethrough and adapted to rotate through an arc of 90° to close or open a path through the valve body to restrict fluid flow to the feed manifold 2.

Figure 2:
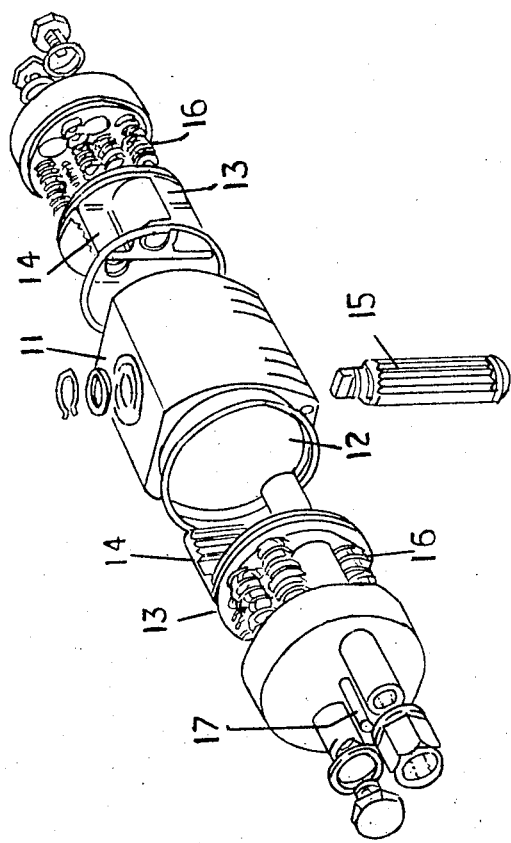
FIG. 2 is an exploded view of an actuator device which forms part of the apparatus illustrated in FIG. 1.

The actuator device 5 illustrated in FIG. 2, comprises a body portion 11, a chamber 12 formed in the body portion between two oppositely acting pistons 13. Each piston 13 is provided with a rack member 14 which are diametrically opposed and a pinion 15 is mounted for rotation between the rack members 14. One end of the pinion is operatively connected to the spindle of the ball valve 4 to rotate the spindle.

Compressed air from the regulating valve 8 is fed into the chamber 12 formed between the pistons 13 to move the pistons axially away from each other against spring means 16.

One end of a rod member 17 abuts one of the pistons 13 and extends axially outwardly from one end of the actuator device. On axial movement of the piston the rod member moves axially. The opposite end of the rod member 17 is operatively connected to a piston 18 in the hydraulic damper means 6 to control the rate of movement of the pistons 13 in the actuator device only when the pistons move axially away from each other so that the rate of opening of the ball valve 4 is controlled and allowing a speedy shut-off of supply should a malfunction occur.

Figure 3:
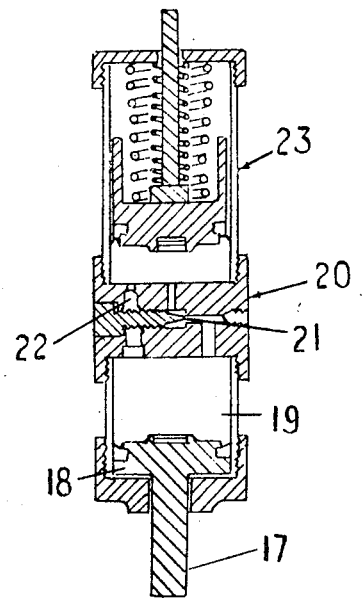
FIGS. 3 to 5 are sectional views of other parts of the apparatus shown in FIG. 1.

The hydraulic damper means 6, illustrated in FIG. 3 controls the rate of opening of the ball valve 4. The piston 18 of the hydraulic damper 6 is slidable in a cylinder 19 formed in the body 20 of the hydraulic damper 6. The cylinder 19 communicates through a variable restriction orifice 21 and a non-return valve 22 with a dashpot device 23.

Figure 4:
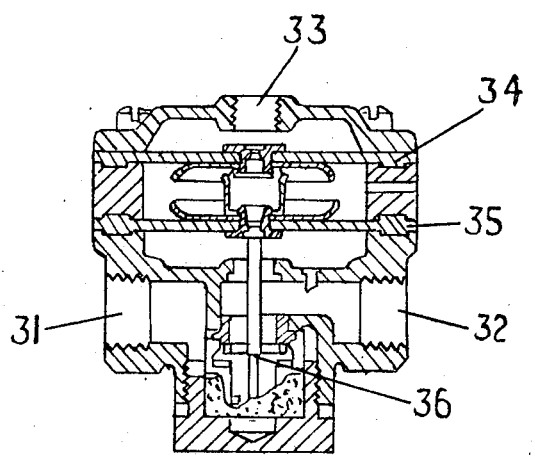

The regulating valve means 8 is of known construction and is illustrated in FIG. 4. The regulating valve means 8 has an inlet 31 communicating with the air pressure supply, an outlet 32 communicating with the chamber 12 in the actuator device 5 and a control signal inlet 33 communicating with the relay valve 9.

The control signal from the relay valve 9 is applied to a pilot pressure diaphragm 34 which acts with a main pressure diaphragm 35 to control a valve 36 intermediate the inlet 31 and outlet 32.

The air pressure from the outlet 32 is proportional to the signal pressure at 33.

The relay valve 9 has the characteristics that the reduction from full output pressure to almost zero pressure is achieved over a signal pressure range of approximately 0.7 p.s.i. which gives the correct degree of sensitivity to feed manifold pressure. The flow of fluid in the form of slip in the main supply manifold is in the approximate range of 30–60 p.s.i. and the apparatus according to the invention provides a presure in the feed manifold 2 that does not exceed a predetermined pressure setting and maintains the pressure despite varying flow conditions.

The hydraulic damper means 6 may consist basically of a piston operating in a cylinder bore which contains fluid. When the piston is moved in one direction it displaces the fluid through a small variable orifice thereby providing a steady rate of movement despite fluctuations in the applied load. The orifice area can be varied by an external control screw to alter the rate of movement.

A pressure regulating valve 40 is located in the main air supply 7 to maintain the air supply at a constant predetermined value.

A pressure gauge 41 may be incorporated in the main air supply 7 to indicate the air supply pressure and a feed manifold pressure gauge 42 indicates the pressure in a volume of trapped air in a chamber 43 above the feed manifold.

A pressure gauge 44 indicates the air presure applied to the actuator device 5.

The pressure gauges are used for setting the apparatus to provide a predetermined pressure in the feed manifold 2.

What is claimed is:

1. Apparatus for controlling the flow of viscous fluids from a supply manifold to a feed manifold comprising a control valve located in the supply adapted to control the pressure of fluid in the feed manifold, penumatically operable actuator means adapted to open and close said control valve, damper means adapted to control the rate of movement of the actuator means when the actuator means is operative to open the control valve, an air pressure supply source, control means for said air pressure supplied to the actuator means and relay means adapted to monitor the feed manifold pressure and to supply a signal to actuate the control means.

2. Apparatus as claimed in claim 1 in which the control valve comprises a ball valve having a spherical shaped valve spindle with a diametrical bore therethrough adapted to rotate through an arc of 90° to open and close a path through the valve when actuated by said actuator means.

3. Apparatus as claimed in claim 1 in which the actuator means comprises a body member, a chamber in said body member formed between two oppositely acting piston members, said piston members each formed with a rack member, a pinion rotatably mounted between said rack members, one end of said pinion operatively connected to said control valve, said damper means hydraulically operable and including a piston slidable in a cylinder and operatively connected to one of said piston members in the actuator means.

4. Apparatus as claimed in claim 1 in which the control means comprises regulating valve means having an air inlet connected to said air pressure supply source, an air outlet communicating with the actuator means and a control signal inlet communicating with said relay valve means, said signal supplied by the relay valve means comprising an inverse output signal pressure and said air pressure provided at said outlet being proportional to the signal pressure.

References Cited
UNITED STATES PATENTS 3,227,171   1/1966   Woelfel _____ 137—488 X HENRY T. KLINKSIEK, Primary Examiner